United States Patent
Hwang et al.

(10) Patent No.: US 7,835,238 B2
(45) Date of Patent: Nov. 16, 2010

(54) METHOD FOR REDUCING ACCESS TIME OF A WRITE-ONCE DISC

(75) Inventors: Sung-hee Hwang, Seoul (KR); Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 11/589,042

(22) Filed: Oct. 30, 2006

(65) Prior Publication Data
US 2007/0041282 A1 Feb. 22, 2007

Related U.S. Application Data

(62) Division of application No. 10/765,954, filed on Jan. 29, 2004.

(30) Foreign Application Priority Data

| Feb. 28, 2003 | (KR) | ............... 2003-12868 |
| Mar. 3, 2003 | (KR) | ............... 2003-12952 |

(51) Int. Cl.
*G11B 5/09* (2006.01)
(52) U.S. Cl. .................. 369/47.14; 369/53.17
(58) Field of Classification Search .............. 369/47.14, 369/53.17, 275.3, 53.15; 714/710, 711
See application file for complete search history.

(56) References Cited

U.S. PATENT DOCUMENTS

| 5,617,393 | A | 4/1997 | Itami et al. |
| 6,160,778 | A | 12/2000 | Ito et al. |
| 6,529,458 | B1 | 3/2003 | Shin |
| 6,581,167 | B1 | 6/2003 | Gotoh et al. |
| 6,615,363 | B1 | 9/2003 | Fukasawa |
| 7,024,534 | B2 | 4/2006 | Sasaki et al. |
| 7,031,239 | B2 | 4/2006 | Takahashi et al. |
| 7,062,626 | B2 | 6/2006 | Sasaki et al. |
| 7,082,092 | B2 | 7/2006 | Weijenbergh et al. |
| 7,155,566 | B2 | 12/2006 | Sasaki et al. |

(Continued)

FOREIGN PATENT DOCUMENTS

CN 1342314 3/2002

(Continued)

OTHER PUBLICATIONS

U.S. Appl. No. 10/765,954, filed Jan. 29, 2004, Sung-hee Hwang et al., Samsung Electronics Co., Ltd.

(Continued)

*Primary Examiner*—Tan X Dinh
(74) *Attorney, Agent, or Firm*—NSIP Law

(57) ABSTRACT

A write-once disc, an apparatus for recording information thereon, and a method of reducing access time thereto the write-once disc including at least one record layer. The write-once disc also includes at least one update area in which updated predetermined information is recorded; and an access information area in which location information regarding the updated predetermined information, is recorded for a predetermined period. Accordingly, it is possible to reduce an access time for reading information updated in the write-once disc on which predetermined information is updated and recorded on a new position.

11 Claims, 7 Drawing Sheets

U.S. PATENT DOCUMENTS

| | | | |
|---|---|---|---|
| 7,313,066 B2 * | 12/2007 | Hwang et al. | 369/53.17 |
| 7,327,655 B2 * | 2/2008 | Hwang et al. | 369/53.17 |
| 7,330,409 B2 | 2/2008 | Hwang et al. | |
| 7,355,934 B2 | 4/2008 | Park et al. | |
| 7,360,126 B2 | 4/2008 | Hwang et al. | |
| 7,385,889 B2 | 6/2008 | Lee et al. | |
| 7,453,781 B2 * | 11/2008 | Gushima et al. | 369/53.24 |
| 7,460,454 B2 * | 12/2008 | Lee et al. | 369/53.17 |
| 7,463,562 B2 * | 12/2008 | Hwang et al. | 369/47.14 |
| 7,719,932 B2 | 5/2010 | Hwang et al. | |
| 2002/0150010 A1 | 10/2002 | Takahashi | |
| 2004/0179458 A1 | 9/2004 | Hwang et al. | |
| 2004/0246851 A1 * | 12/2004 | Hwang et al. | 369/53.16 |
| 2005/0002294 A1 * | 1/2005 | Hwang et al. | 369/47.14 |
| 2005/0007914 A1 * | 1/2005 | Hwang et al. | 369/47.22 |
| 2005/0141400 A1 | 6/2005 | Hwang et al. | |
| 2005/0207319 A1 | 9/2005 | Park | |
| 2006/0203681 A1 | 9/2006 | Hwang et al. | |
| 2007/0041282 A1 | 2/2007 | Hwang et al. | |
| 2007/0121460 A1 | 5/2007 | Kwon et al. | |
| 2008/0002552 A1 | 1/2008 | Hwang et al. | |
| 2008/0025175 A1 | 1/2008 | Hwang et al. | |
| 2008/0094961 A1 | 4/2008 | Hwang et al. | |
| 2008/0101190 A1 | 5/2008 | Hwang et al. | |
| 2008/0106990 A1 | 5/2008 | Hwang et al. | |
| 2008/0106991 A1 | 5/2008 | Lee et al. | |
| 2008/0151720 A1 | 6/2008 | Ko et al. | |
| 2008/0159097 A1 | 7/2008 | Hwang et al. | |
| 2008/0159098 A1 | 7/2008 | Hwang et al. | |
| 2008/0205214 A1 | 8/2008 | Ko et al. | |
| 2008/0205224 A1 | 8/2008 | Hwang et al. | |
| 2008/0205226 A1 | 8/2008 | Hwang et al. | |
| 2008/0304384 A1 | 12/2008 | Hwang et al. | |

FOREIGN PATENT DOCUMENTS

| | | |
|---|---|---|
| JP | 64-46280 | 2/1989 |
| JP | 2000-105980 | 4/2000 |
| KR | 2001-0111248 | 12/2001 |

OTHER PUBLICATIONS

Office Action issued by the State Intellectual Property Office of the People's Republic of China on May 8, 2009.

Office Action issued by the Japanese Patent Office on Jun. 30, 2009.

Malaysian Office Action issued on Feb. 25, 2010, in corresponding Malaysian Patent Application No. PI20040658 (4 pages).

Korean Notice of Allowance issued on Nov. 30, 2009, in counterpart Korean Application No. 10-2003-0012952 (5 pages, in Korean, with partial English translation).

* cited by examiner

METHOD FOR REDUCING ACCESS TIME OF A WRITE-ONCE DISC

CROSS-REFERENCE TO RELATED APPLICATIONS

This application is a division of application Ser. No. 10/765,954 filed Jan. 29, 2004, currently pending, which claims the benefit of Korean Patent Application Nos. 2003-12868 filed on Feb. 28, 2003, and 2003-12952 filed on Mar. 3, 2003, in the Korean Intellectual Property Office, the disclosures of which are incorporated herein by reference.

BACKGROUND OF THE INVENTION

1. Field of the Invention

The present invention relates to recording information on and/or reproducing information from a write-once disc, and more particularly, to a write-once disc, an apparatus for recording information thereon, and a method of reducing access time thereto.

2. Description of the Related Art

Unlike a rewritable disc, it is impossible to rewrite data to a portion of a write-once disc where data has already been recorded. That is, once the data is recorded on the write-once disc, it is impossible to delete the data and record new data thereon. Accordingly, a new portion of the write-once disc must be allotted to update the already recorded data.

In general, since only last updated information on a disc is available, a recording and/or reproducing apparatus first scans the disc to detect the last updated information. The more information to be updated, the longer the time required for scanning the disc to obtain recent information from the disc. In particular, this problem becomes more serious for a write-once disc, since whenever information is updated, the updated information is recorded at different portions of an area of the write-once disc unlike a rewritable disc. If the size of the area where information is updated is reduced to lessen disc scanning time, desired information can be detected fast, but a number of times for updating information is limited.

SUMMARY OF THE INVENTION

The present invention provides a write-once disc, and a method of and apparatus for recording information on the write-once disc in a data structure such that a disc access time for reading updated information is reduced.

According to an aspect of the present invention, there is provided a write-once disc with at least one record layer, including at least one update area in which updated predetermined information is recorded; and an access information area in which location information regarding information, which is last updated and recorded in the at least one update area, is recorded for a predetermined period.

According to another aspect of the present invention, there is provided a write-once disc with at least one record layer, comprising a plurality of update areas in which predetermined information is updated and sequentially recorded; and an access information area in which location information regarding information, which is last updated and recorded in the update areas, is recorded per predetermined period. Here, location information regarding information last updated is recorded in at least one of the update areas.

According to yet another aspect of the present invention, there is provided a method of reducing an access time for accessing a write-once disc with at least one record layer, the method comprising sequentially recording updated predetermined information in at least one update area which is present in at least one of a lead-in area, a data area, a lead-out area, and an outer area; and recording location information regarding information, which is last updated in the update area, in an access information area present in at least one of the lead-in area, the data area, the lead-out area, and the outer area per predetermined period.

According to still another aspect of the present invention, there is provided a method of reducing access time for accessing a write-once disc with at least one record layer, the method comprising sequentially recording updated predetermined information in a plurality of update areas which are present in at least one of a lead-in area, a lead-out area, and an outer area; recording location information regarding information, which is last updated in at least one of the update areas, in one of the update areas; and recording location information regarding the information, which is last updated in one of the update areas, in an access information area present in at least one of the lead-in area, the lead-out area, and the outer area per predetermined period.

According to still another aspect of the present invention, there is provided an apparatus for recording information on a write-once disc with at least one record layer, the apparatus comprising a recording/reading unit that records information on or reads data from the write-once disc; and a controller that controls the recording/reading unit to sequentially record updated predetermined information in at least one update area of the write-once disc, and record location information regarding information, which is last updated in the at least one update area, in an access information area of the write-once disc per predetermined period.

According to still another aspect of the present invention, there is provided an apparatus for recording information on a write-once disc with at least one record layer, the apparatus comprising a recording/reading unit that records information on/or reads data from the write-once disc; and a controller that controls the recording/reading unit to sequentially record updated predetermined information in a plurality of update areas of the write-once disc; record location information regarding information, last updated in one of the update areas; and record location information regarding information last updated in the updated area in an access information area of the write-once disc per predetermined period.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
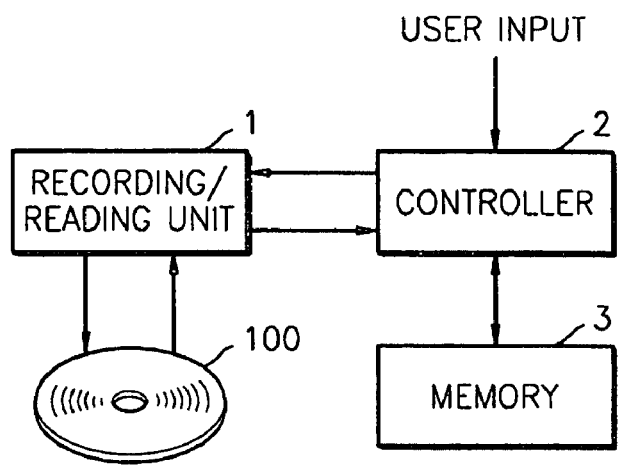
FIG. 1 is a block diagram of a recording apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a block diagram of a recording apparatus according to an embodiment of the present invention. Referring to FIG. 1, the recording apparatus includes a recording/reading unit 1, a controller 2, and a memory 3. The recording/reading unit 1 records data on a disc 100, which is an information storage medium according to an embodiment of the present invention, and reads back the data from the disc 100 to verify the accuracy of the recorded data. The controller 2 controls the recording/reading unit 1 to record data in a data structure according to the present invention. More specifically, the controller 2 controls the recording/reading unit 1 to sequentially record updated information in at least one update area of the disc 100, and record location information, which specifies a recording position of last updated information in the update area, in an access information area of the disc 100 for a predetermined period. In this embodiment, information is recorded in the update area in recording units. The location information is recorded in the access information area whenever a predetermined number of recording operations end or a predetermined number of logical or physical recording blocks of the update area are filled with data. Alternatively, the location information is recorded when at least one of a plurality of update areas is updated a predetermined number of times or a number of times of updating information in the plurality of update areas reaches a predetermined number. Further, if the disc 100 includes the plurality of update areas, the controller 2 controls the recording/reading unit 1 to record location information, which specifies a recording position of last updated information in at least one update area, in the access information area. For disc finalization, the controller 2 controls the recording/reading unit to record the location information regarding information, which is last recorded in the update area, in the access information area.

Here, the recording operation is an operation determined according to a user's intention or a recording work to be performed. According to this embodiment, a recording operation indicates a process in which the disc 100 is loaded into the recording apparatus, data is recorded on the disc 100, and the disc 100 is taken out from the recording apparatus. When a user presses the eject button (not shown) of the recording apparatus in order to remove the disc 100 after recording of data, the controller 2 expects the recording operation to be terminated.

In particular, the controller 2 tests recording conditions to adjust a laser power in the recording/reading unit 1, controls the recording/reading unit to record data based on the test result, and performs disc defect management. More specifically, to adjust the laser power, the controller 2 tests recording conditions in at least one logical or physical block of a test area, where recording conditions are measured, in recording operation units. The test area is included in the update area of the disc 100. Accordingly, it is required to detect a position of the test area where recording conditions will be tested next time. Data recorded for test is recorded and updated in the test area. Also, for disc defect management, the controller 2 uses a verify-after-write method in which data is recorded on the disc 100 in predetermined units of data and the accuracy of the recorded data is verified to detect if an area of the disc 100 has a defect. In other words, the controller 2 controls the recording/reading unit 1 to record user data on the disc 100 in units of recording operations and verifies the recorded user data to detect an area of the disc 100 in which a defect exists. Thereafter, the controller 2 creates information indicating the position of the area with the defect and stores the created information in the memory 3. When the stored information reaches a predetermined amount, the controller 2 controls the recording/reading unit 1 to record the stored information as temporary defect information in an update area, i.e., a temporary defect management area (TDMA), of the disc 100. Next, the controller 2 controls the recording/reading unit 1 to further record temporary defect management information for managing the temporary defect information in the TDMA. During each recording operation, data is recorded and verified at least once; in general, data is recorded and verified several times. Defect information obtained using the verify-after-write method is temporarily stored as temporary defect information in the memory 3. When the recording operation ends, the controller 2 controls the recording/reading unit 1 to rewrite the temporary defect information, which is stored in the memory 3, to a defect management area (DMA) of the disc 100.

When the recording of data is completed, i.e., additional data will not be recorded on the disc 100 (the disc 100 needs to be finalized), and the controller 2 controls the recording/reading unit 1 to rewrite the temporary defect information and the temporary defect management information, stored in the TDMA, to the DMA.

Figure 2A:
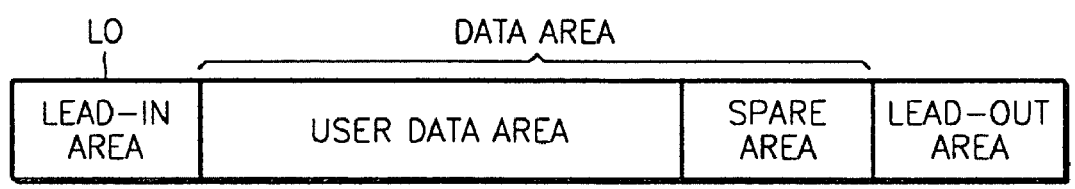
FIGS. 2A and 2B illustrate structures of a write-once disc according to embodiments of the present invention.
Figure 2B:
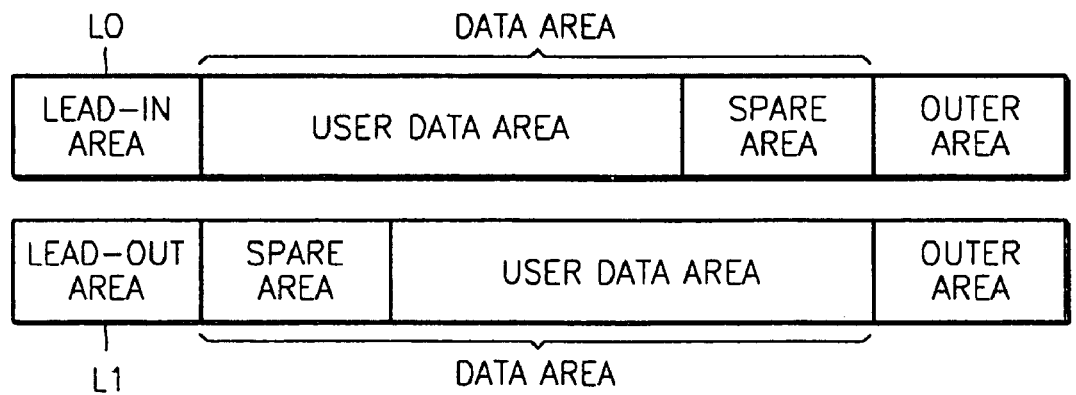

FIGS. 2A and 2B illustrate structures of the disc 100 of FIG. 1, according to embodiments of the present invention. FIG. 2A illustrates in detail a disc 100 having a single record layer L0 (single record layer disc). The disc 100 includes a lead-in area, a data area, and a lead-out area. The lead-in area is located in an inner part of the disc 100 and the lead-out area is located in an outer part of the disc 100. The data area is present between the lead-in area and the lead-out area and divided into a user data area and a spare area. The user data area is an area where user data is recorded, and the spare area is a replacement area for the user data area having a defect, serving to compensate for loss in the recording area due to the defect.

FIG. 2B illustrates a disc 100 having two record layers L0 and L1 (double record layer disc). A lead-in area, a data area, and an outer area are sequentially formed from the inner part of the first record layer L0 to its outer part. Also, an outer area, a data area, and a lead-out area are sequentially formed from the outer part of the second record layer L1 to its inner part.

Unlike the single record layer disc of FIG. 2A, the lead-out area is present in the inner part of the disc 100 of FIG. 2B. That is, the disc 100 of FIG. 2B has an opposite track path (OTP) in which data is recorded starting from the lead-in area of the first record layer L0 toward its outer area and continuing from the outer area of the second record layer L1 to its lead-out area. The spare area is allotted to each of the record layers L0 and L1.

In this embodiment, the spare areas are present between the lead-out area and the user data area and between the user data area and the outer area. However, if necessary, a portion of the user data area may be used as another spare area, that is, more than one spare area may be present between the lead-in area and the lead-out area.

Figure 3:
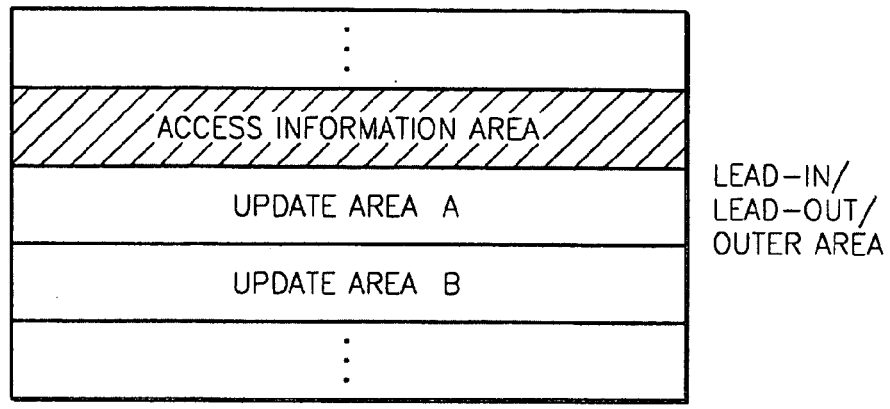
FIG. 3 illustrates a data structure of a write-once disc with an access information area and an update area, according to an embodiment of the present invention.

FIG. 3 illustrates a data structure of the disc 100 of FIGS. 2A and 2B, in which an access information area and update areas are present in a lead-out area or an outer area, according to an embodiment of the present invention. Referring to FIG. 3, if the disc 100 is a single record layer disc, the access information area is present in at least one of the lead-in area and the lead-out area. If the disc 100 is a double record layer disc, the access information area is present in at least one of the lead-in area, the lead-out area, and the outer area. A plurality of the access information areas may be formed in separate areas or may be formed separately in the same area.

Further, when the disc 100 is a single record layer, at least one update area is present in at least one of the lead-in area and the lead-out area. When the disc 100 is a double record layer, at least one update area is present in at least one of the lead-in area, the lead-out area, and the outer area. FIG. 3 illustrates two update areas A and B in which information to be updated is respectively recorded. In this embodiment, predetermined information is updated and recorded in the update areas A and B in recording operation units. A period for updating information may be changed depending on characteristics of information to be recorded or a user's desire. In the access information area, location information regarding respective information that is last updated in the update areas A and B is recorded per predetermined period. In this embodiment, the location information is recorded in a predetermined number of recording operation units or is recorded whenever a predetermined number of logical or physical blocks are filled with information. If necessary, only location information, which specifies recording locations of information updated in parts of a plurality of update areas, may be recorded in the access information area.

For access time, a size of a block, which is a basic unit for error correcting code (ECC), of the update area A is preferably small. During a write operation, location information regarding the location of information last recorded in at least another update area is recorded whenever information recorded in the update area A is recorded. When a total number of recording operations are expected to be small according to characteristics of data to be recorded or a user environment, a period of updating the location information recorded in the access information area is determined to be short. Otherwise, the period may be determined to be long. An instant of time when the location information recorded in the access information area is updated, may also be differently determined.

During a read operation, information for accessing information recorded in the updated areas is obtained by reading location information last recorded in the access information area while scanning the access information area starting from a start thereof. For disc finalization, location information regarding information last recorded in the respective updated areas is recorded in the access information area.

In this embodiment, an update area is present in at least one of the lead-in area, the lead-out area, and the outer area. However, another update area may be further present in a user data area, if necessary. In other words, predetermined information is updated and recorded in an update area, and a location of the update area is not limited.

Figure 4:
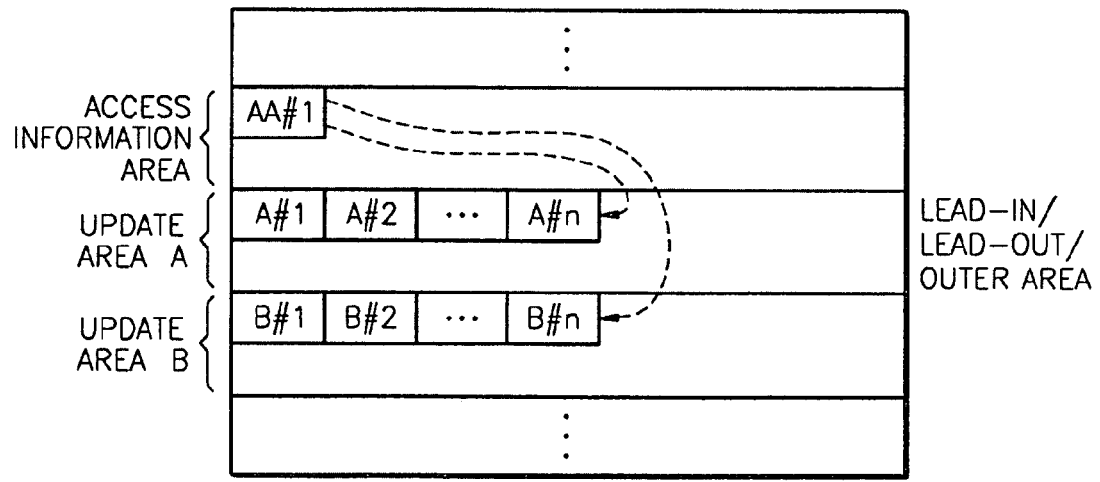
FIG. 4 is a reference diagram illustrating recording of data on a write-once disc, according to an embodiment of the present invention.

FIG. 4 illustrates a method of recording information on the disc 100, according to an embodiment of the present invention. Referring to FIG. 4, information is updated n times and sequentially recorded as A#1, A#2, . . . , A#n in an update area A, and information is updated n times and sequentially recorded as B#1, B#2, . . . , B#n in an update area B. Next, location information AA#1 regarding the information A#n last updated and recorded in the update area A and the information B#n last updated and recorded in the update area B is recorded in an access information area. The location information AA#1 may specify physical or logical addresses of the information A#n and B#n. Next, information is updated n times and sequentially recorded as A#n+1, A#n+2, . . . , A#2n in the update area A, and information is updated n times and sequentially recorded as B#n+1, B#n+2, . . . , B#2n in the update area B. Similarly, location information AA#2 is recorded in the access information area. Alternatively, location information AA#i recorded in the access information area may include only location information regarding information last updated and recorded in the update area A or B.

Further, once information is updated n times and recorded in the update area A or B, location information may be recorded in the access information area regardless of a number of updating information recorded in the other update area B or A. Therefore, when a number of times of updating the information recorded in the update areas A and B is n, the location information may be recorded in the access information area.

Figure 5A:
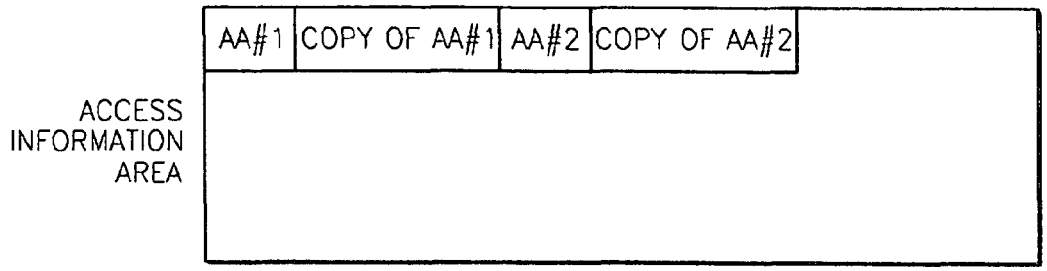
FIGS. 5A through 5D are reference diagrams respectively illustrating location information recorded in an access information area of a write-once disc, according to embodiments of the present invention.

FIGS. 5A through 5D illustrate location information recorded in an access information area, according to embodiments of the present invention. Referring to FIG. 5A, the location information is repeatedly recorded in the access information area. More specifically, first location information AA#1 is recorded at a start of the access information area, so that physical or logical addresses increase. Next, a copy of the first location information AA#1 is recorded. Next, second location information AA#2 is recorded, and then, a copy of the second location information AA#2 is recorded. Recording the same information twice increases the reliability and robustness of information. The number of times of recording the same information may be more than twice and the same information may be recorded using an interleaving method.

Figure 5B:
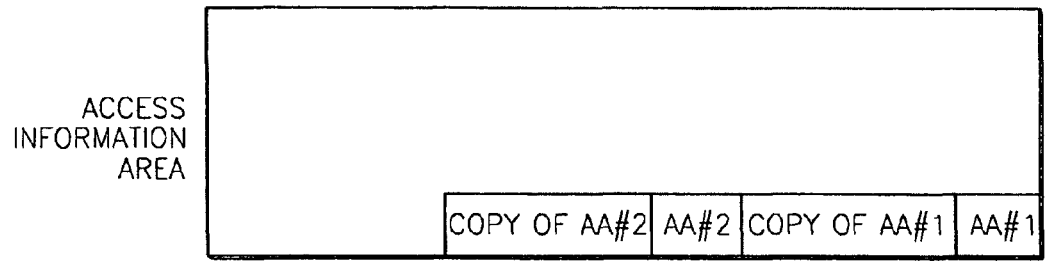

Referring to FIG. 5B, as compared to FIG. 5A, location information is repeatedly recorded in the access information area but the sequence of recording the location information is not the same. More specifically, first location information AA#1 is recorded starting from an end of the access information area, so that physical or logical addresses decrease. Next, a copy of the first location information AA#1 is recorded, and then, second location information AA#2 is recorded. Next, a copy of the second location information AA#2 is recorded. Recording the same information twice increases the reliability and robustness of information. Similarly, the number of times of recording the same information may be more than twice and the same information may be recorded using an interleaving method.

Figure 5C:
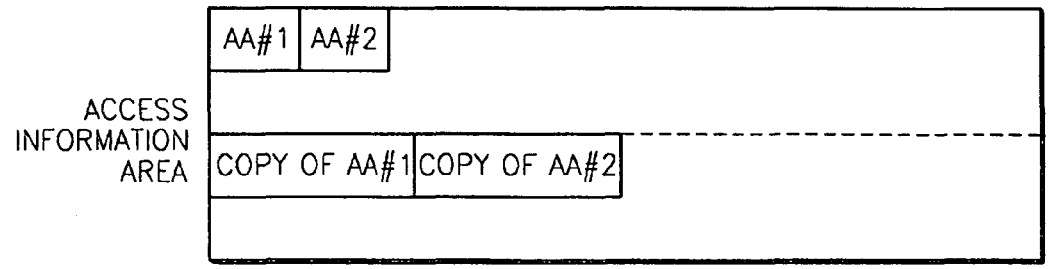

The access information area of FIG. 5C is physically or logically divided into two sub areas. In a first sub area, first location information AA#1 and second location information AA#2 are sequentially recorded, so that physical or logical addresses increase. In a second sub area, a copy of the first location information AA#1 and a copy of the second location information AA#2 are sequentially recorded. Regarding a sequence of recording the information, the first location information AA#1, the copy of the first location information AA#1, the second location information AA#2, and the copy of the second location information AA#2 are sequentially recorded. In this embodiment, the original information and a copy thereof are recorded in different areas, thereby increasing the reliability and robustness of information. Alternatively, the access information area may be divided into three ore more sub areas, and location information may be recorded at least three times.

Figure 5D:
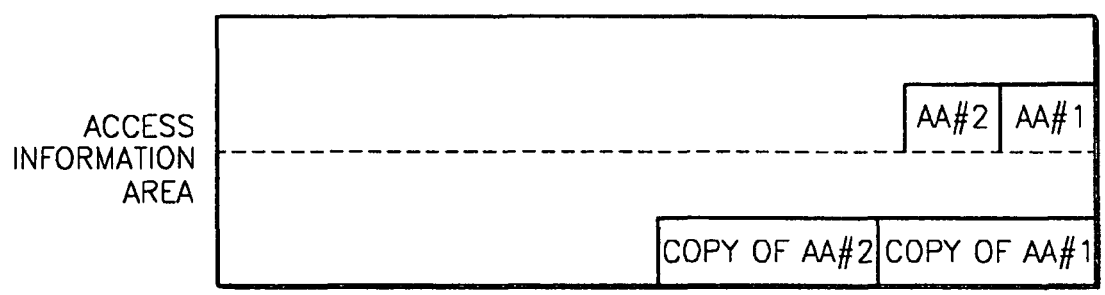

As compared to FIG. 5C, the access information area of FIG. 5D is physically or logically divided into two sub areas, but the sequence of recording location information is not the same. More specifically, first location information AA#1 and second location information AA#2 are sequentially recorded in a first sub area, so that physical or logical addresses decrease. Also, a copy of the first location information AA#1 and a copy of the second location information AA#2 are sequentially recorded in a second sub area, so that physical or logical addresses decrease. The sequence of recording the information is the same as illustrated in FIG. 5C. That is, the first location information AA#1, the copy of the first location information AA#1, the second location information AA#2, and the copy of the second location information AA#2 are sequentially recorded. The original information and a copy thereof are recorded in different areas, thereby increasing the reliability and robustness of information. Alternatively, the access information area may be divided into three ore more sub areas, and location information may be recorded at least three times.

Figure 6:
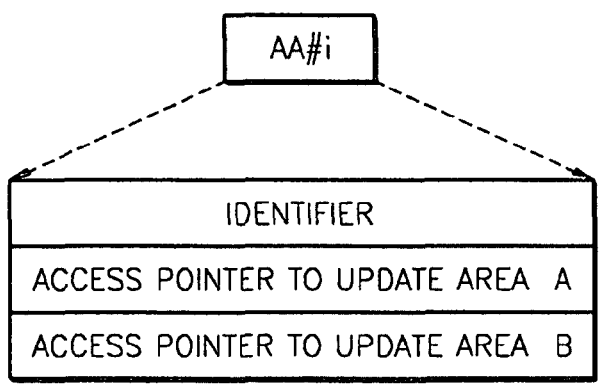
FIG. 6 illustrates a data structure of location information AA #i illustrated in FIGS. 4 and 5A through 5D.

FIG. 6 illustrates a data structure of location information AA#i as shown in FIG. 4 and FIGS. 5A through 5D. Referring to FIG. 6, the location information AA#i contains an identifier, an access pointer to an update area A, and an access pointer to an update area B. The access pointer to the update area A points to a recording position of information last updated and recorded in the update area A. The access pointer to the update area B points to a recording position of information last updated and recorded in the update area B. For instance, an access pointer indicates a starting address of last recorded information.

Figure 7:
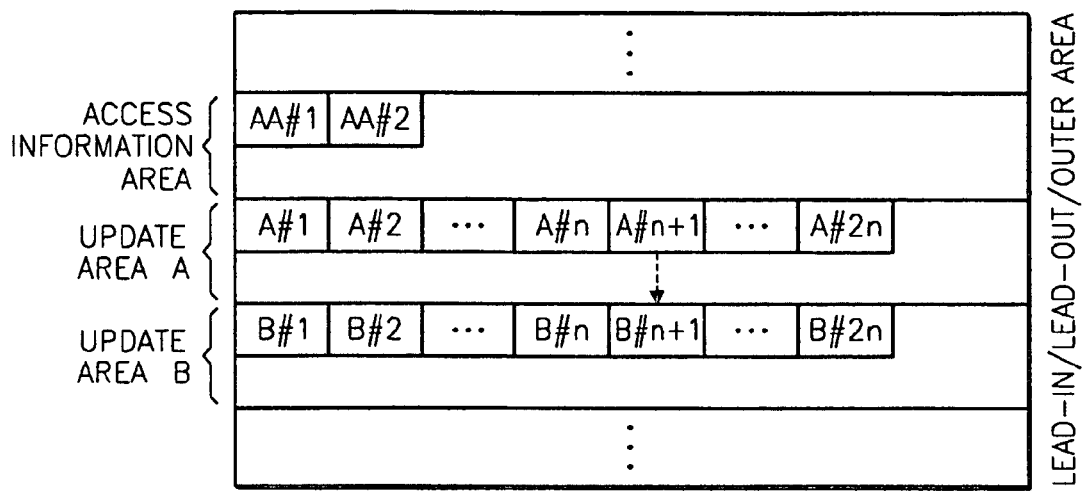
FIG. 7 is a reference diagram illustrating recording of data on a write-once disc, according to another embodiment of the present invention.

FIG. 7 illustrates a method of recording information on the disc 100, according to another embodiment of the present invention. Referring to FIG. 7, as shown in FIG. 4, predetermined information is updated n times and sequentially recorded as A#1, A#2, . . . , A#n in an update area A, and predetermined information is updated n times and sequentially recorded as B#1, B#2, . . . , B#n in an update area B. Next, location information AA#1 regarding information A#n last updated and recorded in the update area A and information B#n last updated and recorded in the update area B is recorded in an access information area. The location information AA#1 may specify physical or logical addresses of the information A#n and B#n. Next, predetermined information is updated n times and sequentially recorded as A#n+1, A#n+2, . . . , A#2n in the update area A, and predetermined information is updated n times and sequentially recorded as B#n+1, B#n+2, . . . , B#2n in the update area B. Next, location information AA#2 regarding information A#2n last updated and recorded in the update area A and information B#2n last updated and recorded in the update area B is recorded in the access information area. Alternatively, location information AA#i recorded in the access information area may include only location information regarding last updated information recorded in the update area A or B.

The information A#1, A#2, . . . , A#n+1, . . . , A#2n further include location information specifying a location of last updated information recorded in the update area B. For instance, the location information included in the information A#n+1, which is recorded in the update area A, points to a recording position of the corresponding information B#n+1 recorded in the update area B. For this reason, whenever the update area B is updated, the update area A must also be updated. For instance, sometimes the information A#1, A#2, . . . , A#n+1, . . . , A#2n need to be updated although there is no change therein, only because the information recorded in the update area B changes. In a worst-case scenario, when instants when updating a plurality of update areas are different from one another, and a recording position of last updated information is recorded in the update area A whenever information recorded in update areas other than the update area A is updated, a size of the update area A is required to be the same as or larger than a sum of sizes of the other update areas. To prevent such a problem, instants when updating the other update areas are preferably the same to minimize the size of the update area A. Also, after recording updated information in the other update areas, the information recorded in the update area A, which is updated, and location information regarding at least one information recorded in the other update areas are recorded in the update area A. Information is recorded in the update area A after completing recording information in the other update areas, since a predetermined recording position of last updated information in the other update areas can be changed. When a position of recording last updated information in the update area B has been determined and location information regarding the last updated information is recorded in the update area A, if an ECC error occurs in the update area B after recording the last updated information in the update area B, a position of the last updated information in the update area B may change.

Figure 8:
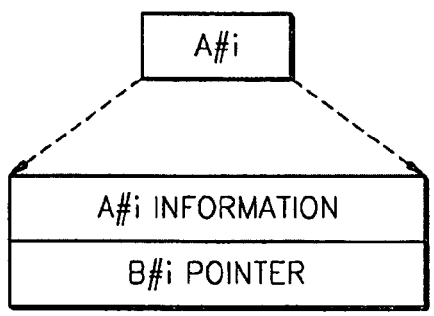
FIG. 8 illustrates a data structure of information A #i recorded in an update area A of FIG. 7.

FIG. 8 illustrates a data structure of information A#i recorded in the update area A of FIG. 7. Referring to FIG. 8, the information A#i includes information regarding itself and a pointer pointing to a location of corresponding information B#i recorded in the update area B of FIG. 7.

Figure 9:
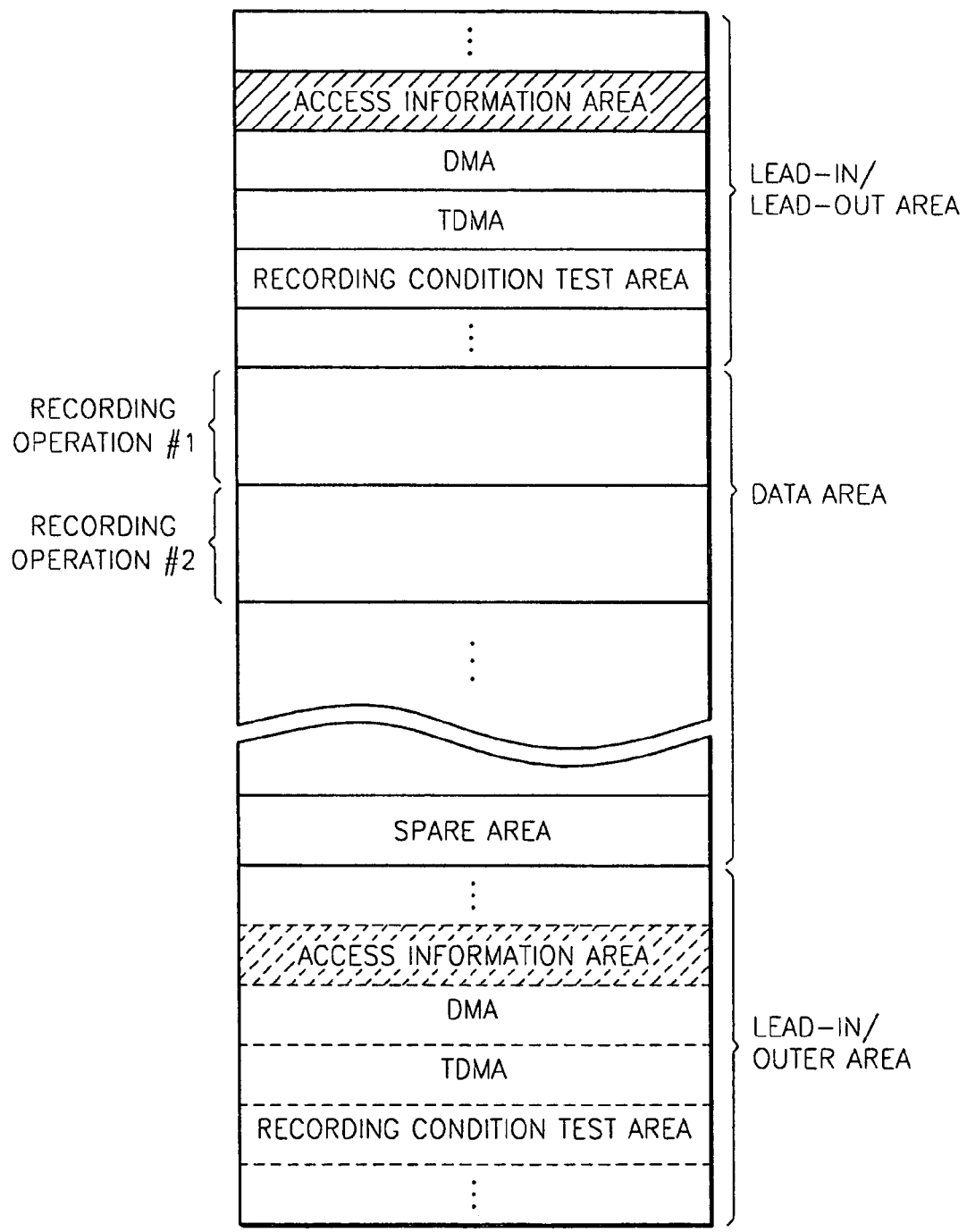
FIG. 9 illustrates a data structure of a write-once disc according to an embodiment of the present invention.

FIG. 9 illustrates a structure of the disc 100 of FIG. 1, according to an embodiment of the present invention. For convenience, FIG. 9 illustrates the disc 100 as a single record layer disc. Referring to FIG. 9, a lead-in area of the disc 100 includes an access information area, a defect management area (DMA), a temporary DMA (TDMA), and a recording condition test area. A lead-out area of the disc 100 includes at least one of an access information area, a DMA, a TDMA, and a recording condition test area. That is, the access information area, the DMA, the TDMA, and the recording condition test area may be present in at least one of the lead-in area and the lead-out area. If the disc 100 is a double record layer disc, an access information area, a DMA, a TDMA, and a recording condition test area are included in each of a lead-in area and a lead-out area positioned in an inner part of the disc 100. Also, an access information area, a DMA, a TDMA, and a recording condition test area are included in each of a lead-in area and a lead-out area positioned in an outer part of the disc 100.

Here, the TDMA and the recording condition test area correspond to the update areas A and B of FIGS. 3, 4, or 7. In the access information area, location information regarding temporary management information updated and recorded in the TDMA, and location information regarding a portion of the recording condition test area where recording conditions are last tested are recorded. The temporary management information includes temporary defect information and temporary defect management information. The location information regarding a portion of the recording condition test area may specify a start address of a portion of the recording condition test area where recording conditions will be tested next time. Alternatively, location information regarding information recorded in the TDMA or the recording condition test area may be selectively recorded in the access information area. In the TDMA, the location information regarding a portion of the recording condition test area where recording conditions are last tested is recorded.

In this embodiment, a recording apparatus tests recording conditions in the recording condition test area for every recording operation, records information on the disc 100 based on the test result, and records temporary management information in the TDMA whenever a recording operation ends. Thus, information recorded in the TDMA and information in the recording condition test area are updated in recording operation units. Also, location information regarding the recording condition test area is recorded together with the temporary management information in the TDMA.

In general, information regarding a structure of a disc on which disc defect management is performed, whether the disc defect management is performed or not, a location and information regarding a defect, and a size and location of a spare area are recorded in the DMA.

When the disc 100 is loaded into a recording/reading apparatus such as that shown in FIG. 1, the apparatus generally reads data from a lead-in area and/or a lead-out area of the disc 100 to determine how to manage the disc 100 and to record data on or read data from the disc 100. However, if the amount of data recorded in the lead-in area and/or the lead-out area increases, a longer time is required for preparing the recording or reproducing of data after the loading of the disc 100. To solve this problem or for other reasons, the present invention adopts temporary defect management information and temporary defect information that are to be recorded in a TDMA. The TDMA is allotted to the lead-in area and/or the lead-out area of a disc, being separated from the DMA. For disc finalization, temporary management information, including temporary defect information and temporary defect management information, which is last recorded in the TDMA, is recorded in the DMA. That is, when additional information will not be recorded, that is, disc finalization is required, only last recorded information of the temporary defect management information and temporary defect information, which have been updated several times, are rewritten to the DMA. Thus, the recording/reading apparatus can read defect management information fast from the disc 100 just by reading the last recorded defect management information, thereby enabling fast initializing of the disc 100.

In this embodiment, since the disc defect management is performed using linear replacement, the temporary defect information includes information indicating the position of an area of the disc 100 having a defect and information indicating the position of an area of the disc 100 that is replacement for the area having the defect. The temporary defect management information is used to manage the temporary defect information and includes information indicating the position of the disc 100 where the temporary defect information is recorded.

In this embodiment, the temporary defect information and temporary defect management information are recorded every time when a recording operation ends. In the TDMA, information regarding a defect, which occurs in data recorded during recording operation #1, and information regarding a replacement area are recorded as temporary defect information #1, and information regarding a defect, which occurs in data recorded during recording operation #2, and information regarding a replacement area are recorded as temporary defect information #2. Further, in the TDMA, management information for managing temporary defect information #1, #2, . . . is recorded as temporary defect management information #1, #2, . . . The management information specifies recording positions of the temporary defect information #1, #2, . . .

When additional data cannot be recorded in the data area or a user does not desire to record additional data therein, i.e., disc finalization is required, temporary defect information recorded in a temporary defect information area and temporary defect management information recorded in a temporary defect management information area are rewritten to the DMA. For disc finalization, the last recorded temporary defect information #1, #2, . . . , #i is read and rewritten to the DMA.

Figure 10:
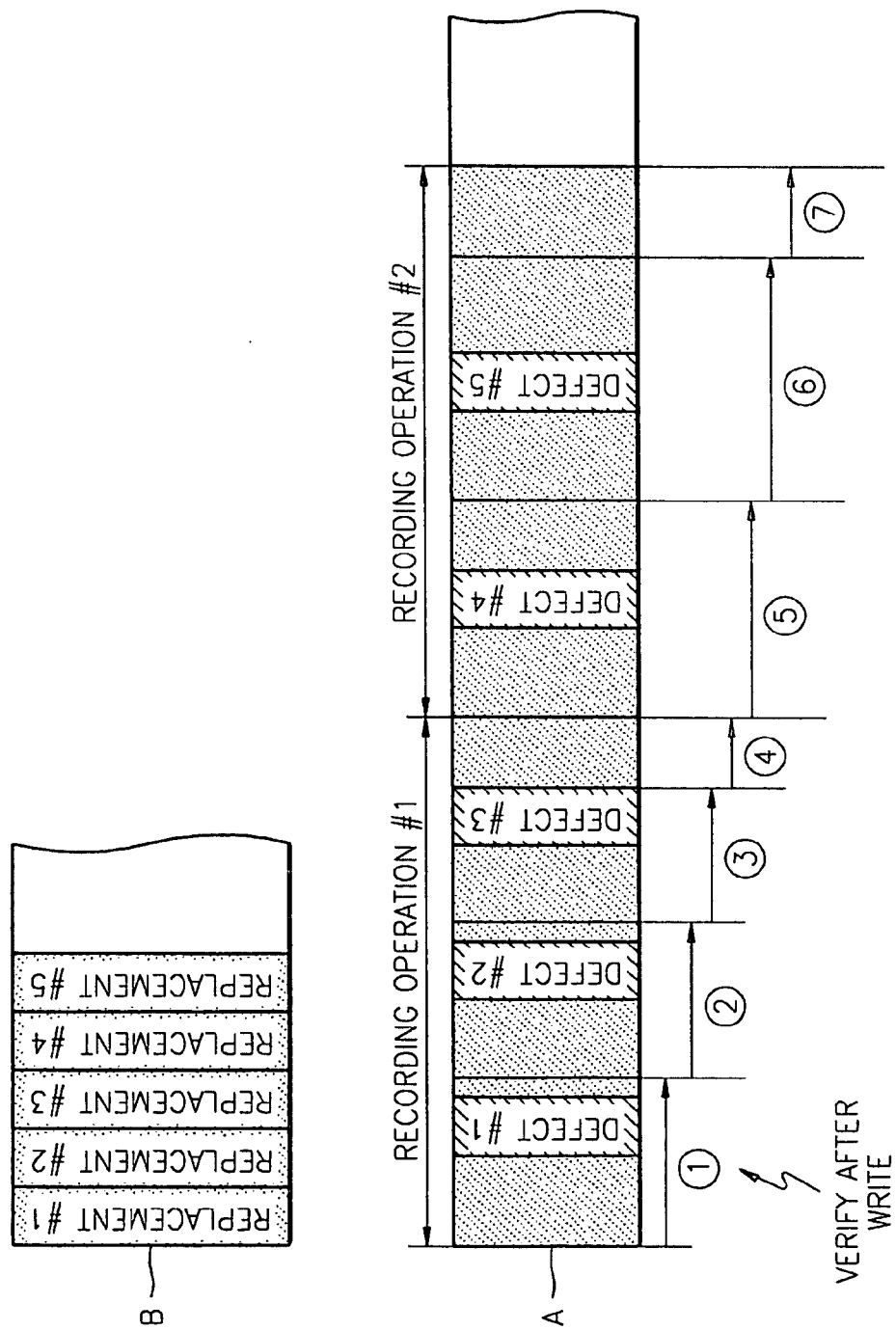
FIG. 10 illustrates detailed diagrams for explaining recording of data in a user data area and a spare area of a write-once disc, according to an embodiment of the present invention.

FIG. 10 is a detailed reference diagram illustrating recording of data in a user data area A and a spare area B, according to an embodiment of the present invention.

Data can be processed in sector units or clusters. A sector denotes a minimum unit of data that can be managed in a file system of a computer or in an application, and a cluster denotes a minimum unit of data that can be physically recorded on a disc at once. In general, one or more sectors constitute a cluster.

There are two types of sectors: a physical sector and a logical sector. The physical sector is an area on a disc where a sector of data is to be recorded. An address for detecting the physical sector is called a physical sector number (PSN). The logical sector is a unit in which data can be managed in a file system or an application. An address for detecting the logical sector is called a logical sector number (LSN). A disc recording/reading apparatus such as that in FIG. 1 detects the recording position of data on a disc using a PSN. In a computer or an application for recording or reproducing data, the entire data is managed in units of LSNs and the position of data is detected using an LSN. LSNs and PSNs are mapped by a controller of the recording/reading apparatus, based on whether the disc 100 contains a defect and an initial recording position of data.

Referring to FIG. 10, A denotes a user data area and B denotes a spare area in which PSNs are sequentially allocated to a plurality of sectors (not shown). In general, each LSN corresponds to at least one PSN. However, since LSNs are allocated to non-defective areas, including replacements recorded in the spare area, the correspondence between the PSNs and the LSNs is not maintained when a disc has a defective area, even if the size of a physical sector is the same as that of a logical sector.

In the user data area A, user data is recorded either in a continuous recording mode or a random recording mode. In the continuous recording mode, user data is recorded sequentially and continuously. In the random recording mode, user data is randomly recorded. In the data area A, sections 1 through 7 denote predetermined units of data in which the verify-after-write method is performed.

When the disc 100 is loaded into the recording/reading apparatus, the apparatus tests recording conditions in a recording condition test area of the disc 100, adjusts a laser power based on the test result, and records information on the disc 100. As described above, once recording conditions are tested in a portion of the recording condition test area, the portion becomes unavailable, and thus, another portion will be used the next time for testing the recording conditions.

The recording apparatus records user data in section 1, returns to the start of section 1, and checks if the user data is appropriately recorded or a defect exists in section 1. If a defect is detected in a portion of section 1, the portion is designated as defect #1. The user data recorded in defect #1 is also recorded on a portion of the spare area B. Here, the portion of the spare area B in which data recorded in defect #1 is rewritten is called replacement #1. Next, the recording apparatus records user data in section 2, returns to the start of section 2, and checks whether the data is properly recorded or a defect exists in section 2. If a defect is detected in a portion of section 2, the portion is designated as defect #2. Likewise, replacement #2 corresponding to defect #2 is formed in the spare area B. Further, defect #3 and replacement #3 are designated in section 3 of the user data area A and the spare area B, respectively. In section 4, a defect does not occur and a defective area is not designated.

The recording apparatus records information regarding defect #1, #2, and #3 occurring in sections 1 through 4 as temporary defect information TDFL #1 in a TDMA, when recording operation #1 is expected to end, after the recording and verifying of data to section 4, i.e., when a user presses the eject button of a recording apparatus or recording of user data allocated in a recording operation is complete. Also, management information for managing temporary defect information TDFL #1 is recorded as temporary defect management information TDDS #1 in the TDMA. Also, location information regarding a portion of the recording condition test area in which a next test will be performed is further recorded in the TDMA.

When the disc 100 is again loaded, recording operation #2 starts, recording conditions are measured in the recording condition test area, and data is recorded on the disc 100 based on the measuring result. More specifically, during recording operation #2, data is recorded in sections 5 through 7 and defects #4 and #5 and replacements #4 and #5 are formed in the user data area A and the spare area B, respectively, as explained for sections 1 through 4. If recording operation #2 is expected to end, the recording apparatus records information regarding defects #4 and #5 as temporary defect information TDFL #2. Thereafter, management information for managing the temporary defect information TDFL #2 is recorded as temporary defect management information TDDS #2 in the TDMA. Also, location information regarding a portion of the recording condition test area in which a next test will be performed is further recorded in the TDMA. When a predetermined number of recording operations are performed as described above, location information regarding last recorded temporary management information recorded in the TDMA, and location information regarding a portion of the recording condition test area where a next test of recording conditions will be performed, are recorded in an access information area of the disc 100. The temporary management information includes temporary defect information and defect management information.

According to the present invention, an access time for the disc 100 can be reduced as described below.

If ECC is performed in block units and reproduction time of a block is 1, data recording is performed in block units that are also ECC units. When data recording is performed in update areas A, B, and C according to a recording operation and as a result, the amount of information to be updated exceeds a block, the access information area is very helpful. When information to be updated can be recorded within a block, a number of times of performing recording operations is equivalent to a number of blocks used. In this case, it is easy to estimate a recording position of information updated.

When information to be updated according to a recording operation can be recorded within a block, the information is updated in a following update area A, B, or C whenever a following number of recording operations are performed:

update area A: 1000 blocks, a number of recording operations =a update area B: 1000 blocks, a number of recording operations =b update area C: 1000 blocks, a number of recording operations =c In this case, a time for obtaining desired information from the respective update areas A, B, and C depends on whether the access information is present or not in the disc 100, as follows:

when the access information area is present: $(a+b+c)/30+(a+b+c)\%30$ (% indicates a modular operation)

when the access information area is not present: $a+b+c$

In conclusion, the time for obtaining desired information from the respective update areas A, B, and C is the same regardless of the inclusion of the access information area, until a recording operation is performed thirty times, for example. However, once a number of times of performing the recording operation is more than 30, a time required to reproduce information from twenty nine blocks can be saved when the recording operation is further performed thirty times. If a recording operation is performed 299 times in an update area, it is possible to save a time required to reproduce information from 260 blocks, i.e., $9*29-1=260$. In other words, if the disc 100 does not include the access information area, the time required to reproduce information from 299 blocks is spent accessing an update area and scanning and obtaining new information from the update area. However, if the disc 100 includes the access information area, the time required to reproduce information from only 39 blocks is spent. Accordingly, the inclusion of the access information area into the disc 100 causes a reduction in a time for obtaining recent information.

As described above, according to the present invention, it is possible to minimize an access time for accessing a write-once disc, on which predetermined information is updated and recorded at a new position, so as to read the updated information.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of recording data on a write-once disc with at least one record layer, the method comprising:

recording temporary management information in a temporary defect management area of the disc, the temporary management information comprising location information regarding a portion of a recording condition test area and information on defect blocks, the temporary management information being updated according to usage of the disc; and recording information on recording location of the temporary management information, in an access information area of the disc.

2. The method of claim 1, wherein the recording information on recording location of the temporary management information is performed whenever a predetermined number of recording operations end.

3. The method of claim 1, wherein the recording information on recording location of the temporary management information is performed whenever a predetermined number of blocks of the temporary defect management area are filled with data.

4. The method of claim 1, wherein, during the recording information on recording location of the temporary management information, the information on recording location of the temporary management information is recorded in the access information area several times.

5. A non-transitory information storage medium for use with a recording/reproducing apparatus, the non-transitory information storage medium comprising:
   a recording condition test area in which test data for a recording condition test is recorded by the recording/reproducing apparatus;
   a temporary defect management area in which temporary management information is recorded, the temporary management information comprising location information regarding a portion of the recording condition test area and information on defect blocks, the temporary management information being updated according to the usage of the information storage medium; and
   an access information area in which information on recording location of the temporary management information is recorded.

6. A method for reproducing data from an information storage medium, the method comprising:
   obtaining information on recording location of the temporary management information from an access information area of the information storage medium; and
   obtaining the temporary management information from a temporary defect management area of the information storage medium using the information on recording location of the temporary management information,
   wherein:
      the temporary management information comprises location information regarding a portion of a recording condition test area and information on defect blocks, and
      the temporary management information is updated according to usage of the information storage medium.

7. The method of claim 1, wherein the temporary management information further comprises a pointer indicating an area in which the information on defect blocks is recorded.

8. The non-transitory information storage medium of claim 5, wherein the temporary management information further comprises a pointer indicating an area in which the information on defect blocks is recorded.

9. The method of claim 1, wherein the portion of the recording condition test area is a portion of the recording condition test area where a test of recording conditions will be performed a next time; and
   the location information comprises a start address of the portion of the recording condition test area where the test of recording conditions will be performed the next time.

10. The non-transitory information storage medium of claim 5, wherein the portion of the recording condition test area is a portion of the recording condition test area in which the test data for the recording condition test will be recorded by the recording/reproducing apparatus a next time; and
    the location information comprises a start address of the portion of the recording condition test area in which the test data for the recording condition test will be recorded by the recording/reproducing apparatus the next time.

11. The method of claim 6, wherein the portion of the recording condition test area is a portion of the recording condition test area where a test of recording conditions will be performed a next time; and
    the location information comprises a start address of the portion of the recording condition test area where the test of recording conditions will be performed the next time.

* * * * *